United States Patent [19]
Ibanez-Meier et al.

[11] Patent Number: 6,144,654
[45] Date of Patent: *Nov. 7, 2000

[54] METHOD OF COMBINING AND SEPARATING GROUPS OF MULTIPLE CDMA-ENCODED DATA SIGNALS AND APPARATUS THEREFOR

[75] Inventors: Rodrigo Ibanez-Meier, Chandler; Brian Michael Daniel, Phoenix; Keith Andrew Olds, Mesa; William George Schmidt, Sun Lakes, all of Ariz.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/929,122

[22] Filed: Sep. 3, 1997

[51] Int. Cl.[7] .............................. H04J 13/04; H04L 12/00
[52] U.S. Cl. .......................... 370/342; 370/323; 370/441; 370/479
[58] Field of Search ...................................... 370/209, 320, 370/335, 342, 441, 479, 323, 325, 316; 375/200, 206

[56] References Cited

U.S. PATENT DOCUMENTS

| | | | |
|---|---|---|---|
| 5,815,527 | 9/1998 | Erving | 370/320 |
| 5,838,669 | 11/1998 | Gerakoulis | 370/320 |
| 5,860,058 | 1/1999 | Daniel et al. | 455/427 |
| 5,903,549 | 5/1999 | Von Der Embse et al. | 370/320 |

*Primary Examiner*—Chi H. Pham
*Assistant Examiner*—Frank Duong
*Attorney, Agent, or Firm*—Walter W. Nielsen; Frank J. Bogacz

[57] ABSTRACT

A method and apparatus for combining and separating groups of signals starts by a transmitter (500) receiving a number of CDMA-encoded signals from data sources (510). The CDMA-encoded signals are sorted (502) based on their intended destinations. Those CDMA-encoded signals which are intended for a common destination are multiplexed (504) together into a group. The group is further CDMA encoded (506) using a group code and the encoded group is transmitted (508) to an intermediate transceiver (600) or a destination transceiver (700). The intermediate or destination transceiver decodes (604, 704) the group using the appropriate group code and routes the resulting group of signals accordingly.

6 Claims, 3 Drawing Sheets

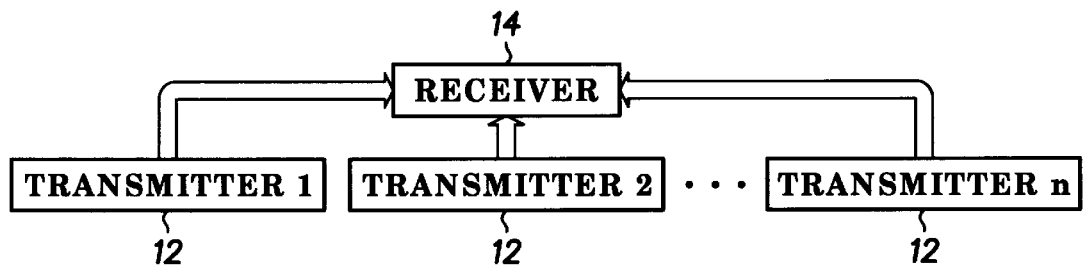
FIG. 1
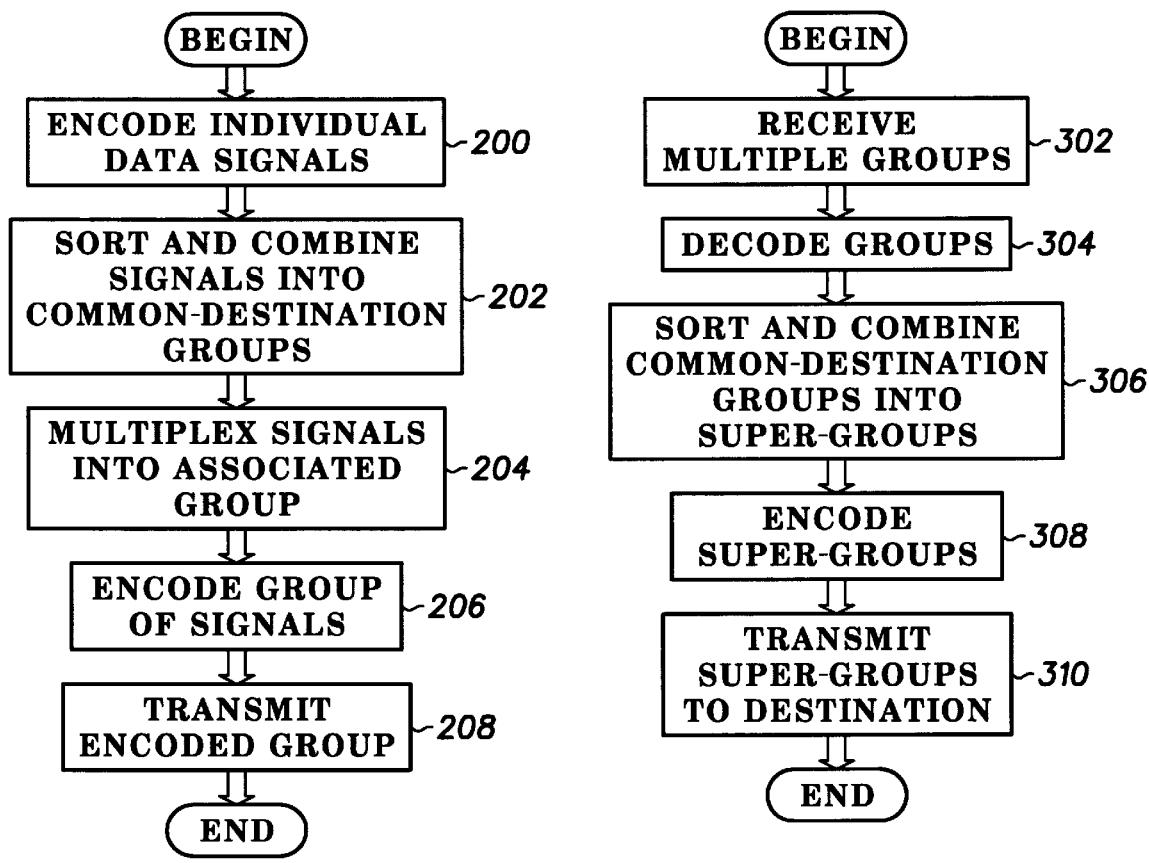
FIG. 2
FIG. 3

METHOD OF COMBINING AND SEPARATING GROUPS OF MULTIPLE CDMA-ENCODED DATA SIGNALS AND APPARATUS THEREFOR

FIELD OF THE INVENTION

The present invention relates generally to wireless communications and, more particularly, to modulation, demodulation, and routing of Code Division Multiple Access (CDMA) signals.

BACKGROUND OF THE INVENTION

A transceiver node (e.g., a satellite) of a wireless communication system is used to transmit information to communication units (e.g., mobile subscriber units), receive information from communication units, and route information to remote destination devices through other transceiver nodes. Where multiple communication units are serviced by a single transceiver node, traditional multiple access techniques isolate signals from each communication unit by providing each unit with a unique disjoint frequency or time slot. These techniques include Frequency Division Multiple Access (FDMA) and Time Division Multiple Access (TDMA), respectively. Multiple access can also be provided through sharing of a common spectrum, where allocation of disjoint frequency or time resources to each user is not attempted. Using the technique of spectrum sharing, or Code Division Multiple Access (CDMA), all bandwidth resources are allocated to all simultaneous users. Each user employs a noise-like but deterministic wideband signal occupying the entire frequency allocation.

Common to all of the above multiple access techniques is the limitation that data packets within a multiple access signal must be isolated by intermediate transceiver nodes between a transmitting unit and a destination transceiver node (i.e., a node which ultimately delivers the signal to a destination device). The signals must be isolated so that routing information associated with each data packet can be evaluated, and the packet can be routed by a "routing transponder" or "node" to the destination node or another intermediate node accordingly.

The data packet isolation method depends on the type of multiple access technique employed. For example, in a system employing TDMA, each intermediate transceiver node must extract each data packet from the time slot to which it is assigned, evaluate the routing data, determine the destination transceiver node based on the data, repack the data packet into a signal in another appropriate time slot, and then route the signal toward the destination node.

The evaluation and routing functions performed by the node, referred to herein as "onboard processing" increase proportionally with the number of active communication units supported by the node. Consequently, the service capacity of a node depends on the amount of hardware and software resources available to onboard processing tasks. Substantially higher capacities would likely result in higher costs and greater size and/or weight of the intermediate node (e.g., higher satellite costs and weight).

What is needed is a method and apparatus to substantially reduce onboard processing performed by transceiver nodes. Further needed is a method and apparatus for rapidly routing data through a communication system. Further needed is a method and apparatus for rapidly routing data contained within CDMA signals.

BRIEF DESCRIPTION OF THE DRAWINGS

FIG. 1 illustrates a wireless communication system in accordance with a preferred embodiment of the present invention;

FIG. 2 illustrates a flowchart of a method for combining groups of CDMA-encoded signals in accordance with a preferred embodiment of the present invention;

FIG. 3 illustrates a flowchart of a method for separating and regrouping groups of CDMA-encoded signals in accordance with a preferred embodiment of the present invention;

DETAILED DESCRIPTION OF THE DRAWINGS

The method and apparatus of the present invention substantially reduces onboard processing performed by transceiver nodes. In addition, the method and apparatus of the present invention rapidly routes data through a communication system, particularly data contained within groups of CDMA signals. The method and apparatus of the present invention is useful for communication of any type of data, including voice, facsimile, or other types of data.

Basically, in a preferred embodiment, multiple data sources provide CDMA-encoded signals to a transmitter. The transmitter groups together those CDMA-encoded signals which are intended for a common destination, and further CDMA encodes the common-destination group using a "group" or "overlaying" CDMA code. The transmitter then sends the encoded group to a receiver, which decodes the overlayed CDMA code for the common-destination group, but not the underlying CDMA codes associated with the original CDMA-encoded signals. Based on the group code, the receiver sends the group of CDMA-encoded signals to an appropriate destination transceiver. The method and apparatus associated with the preferred embodiment are described in detail in conjunction with FIGS. 2–7.

The method and apparatus of the present invention enables the receiver to perform the routing function using very little onboard processing. This could result in less expensive and lighter receiver equipment because not as much processing equipment is necessary. This is particularly advantageous in conjunction with satellite communication system because weight is an especially important consideration for systems which employ satellites. Another advantage to the method and apparatus of the present invention is that, because signal isolation at intermediate receivers is not necessary, routing is quicker, thus reducing throughput delay through the system.

FIG. 1 illustrates a wireless communication system in accordance with a preferred embodiment of the present invention. Communication system 10 includes multiple transmitters 12 and at least one receiver 14. As will be described in detail, below, each transmitter 12 sends one or more "groups" of CDMA-encoded signals to receiver 14. Receiver 14, thus, receives a number of groups of CDMA-encoded signals. Receiver 14 separates out each group and routes each group toward its appropriate destination (not shown).

Figure 6:
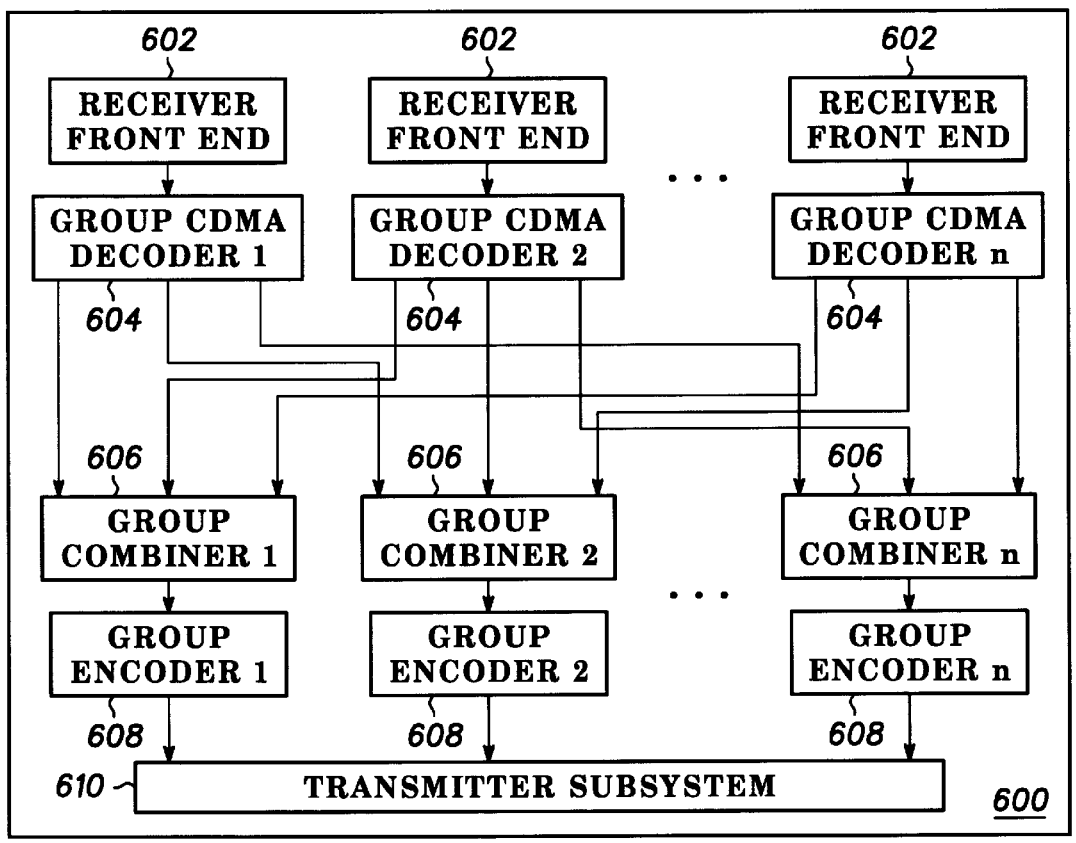
FIG. 6 illustrates an intermediate transceiver in accordance with a preferred embodiment of the present invention.
Figure 7:
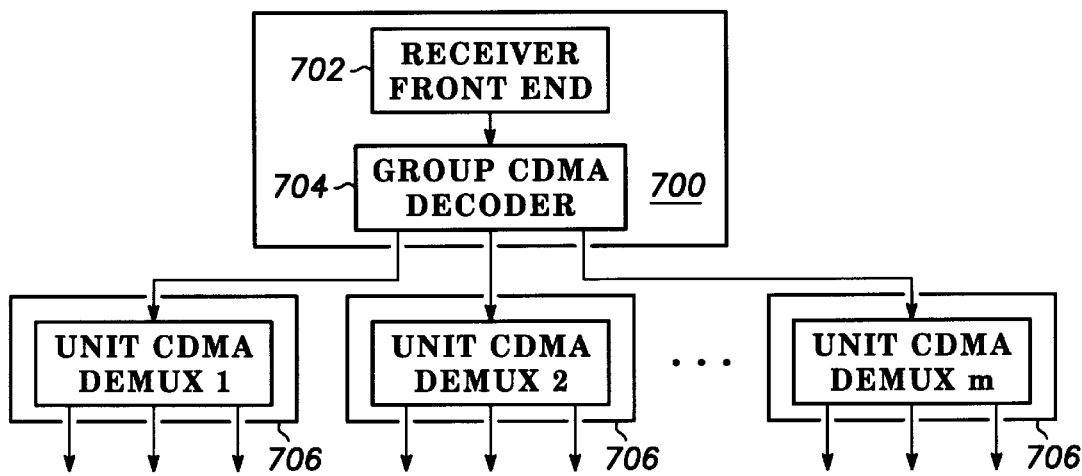
FIG. 7 illustrates a destination transceiver in accordance with a preferred embodiment of the present invention.

Receiver 14 could be a "destination transceiver", as described in conjunction with FIG. 7, which is responsible for sending ungrouped CDMA-encoded signals to the destination devices. Alternatively, as will be described in detail in conjunction with FIG. 6, receiver 14 could be an "intermediate transceiver" which decodes group codes of received signals, regroups the signals, and recodes the groups based on their next destination.

The method and apparatus of the present invention could be used in any type of wired or wireless communication system which employs CDMA encoding. Additionally, the method and apparatus of the present invention could be used in a terrestrial or satellite-based communication systems (e.g., terrestrial dispatched radio systems or satellite cellular communication systems). In a satellite communication system, for example, a transmitter 12 could be a first satellite which receives a number of CDMA-encoded signals from mobile telephones or radios. Receivers 14 could be intermediate satellites in the routing path between source and destination and also those satellites which provide communication services to destination devices.

FIG. 2 illustrates a flowchart of a method for combining groups of CDMA-encoded signals in accordance with a preferred embodiment of the present invention. In a preferred embodiment, the method is performed by a transmitter (e.g., transmitter 500, FIG. 5) and associated data sources. For example, data sources could be mobile telephones, facsimile machines, or other wireless data sources.

The method begins, in step 200, when the multiple data sources CDMA encode a number of individual data signals. These data signals can be encoded using CDMA techniques well known to those of skill in the art. Desirably, the signals are orthogonally encoded so that an associated decoder can most accurately extract the original signals.

In step 202, the encoded signals are sorted and combined based on their intended destination. Encoded signals sharing the same destination would be grouped together. The destination could represent an intermediate transceiver along the communication path between source and destination devices, for example, or it could represent the destination transceiver which ultimately will deliver the CDMA-encoded signal to the destination device. A destination transceiver could be identified, for example, as a satellite or radio servicing a particular area, by a cell number, or by other means. The particular way that an intermediate transceiver or a destination transceiver is identified is not crucial to the method and apparatus of the present invention. What is important is that multiple signals destined for the same intermediate transceiver or destination transceiver are grouped together prior to transmission.

In step 204, the CDMA-encoded signals are multiplexed into the common-destination group to which they belong. Then, in step 206, the combined group of CDMA-encoded signals are CDMA-encoded together as a group. This second CDMA-encoding procedure is referred to, herein, as "group encoding". The group encoding is performed using a "group code" or "overlaying code" which is distinct for that group. In a preferred embodiment, the chip rate for the group encoding step is faster than the chip rate used to encode any of the individual signals within the group.

In step 208, the encoded group is sent to a receiver (e.g., receiver 14, FIG. 1). As described previously, the receiver could be either an intermediate transceiver or a destination transceiver. The procedure then ends. As will be described in detail in conjunction with FIGS. 3 and 4, the receiver is able to rapidly route the group of signals and save on-board processing by taking advantage of the fact that each group of CDMA signals, as a whole, is encoded with the same group code.

FIG. 3 illustrates a flowchart of a method for separating and regrouping groups of CDMA-encoded signals in accordance with a preferred embodiment of the present invention. In a preferred embodiment, the method is performed by an intermediate transceiver (e.g., transceiver 600, FIG. 6).

The method begins, in step 302, when the intermediate transceiver receives multiple encoded groups from multiple transmitters. In step 304, each group is decoded using the appropriate group code.

The decoded groups are then sorted into "super-groups" such that those groups which are destined for the same destination are grouped together. In step 306, the super groups are combined. Thus, each new super-group contains one or more of the received groups.

In step 308, the super-groups are again encoded with group codes which correspond to their next destination device, and the encoded super-groups are transmitted, in step 310 to the next destinations. The procedure then ends. When the group or super-group reaches the destination transceiver, the method illustrated in FIG. 4 is executed.

Figure 4:
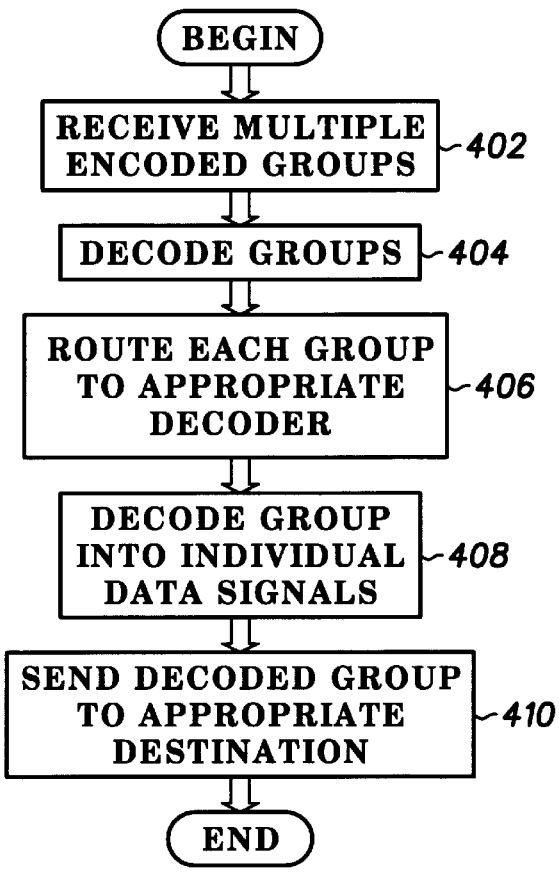
FIG. 4 illustrates a flowchart of a method for separating groups of CDMA-encoded signals in accordance with a preferred embodiment of the present invention.

FIG. 4 illustrates a flowchart of a method for separating groups of CDMA-encoded signals in accordance with a preferred embodiment of the present invention. In a preferred embodiment, the method is performed by a destination transceiver (e.g., destination transceiver 700, FIG. 7).

As illustrated in FIG. 1, each receiver receives signals from multiple transmitters. The method begins, in step 402, when the receiver receives a number of groups of signals from multiple transmitters.

In step 404, the receiver decodes the CDMA-encoded groups. As explained previously, each group is encoded with a particular group code. During decoding, the receiver identifies each groups' group code in order to identify the destination transceiver associated with each group. The receiver could identify the appropriate destination transceiver, for example, by comparing a group's code with a list which associates group codes to a destination transceivers. In step 406, the decoder routes each group to the associated destination transceiver.

In step 408, the destination decoder decodes the signal group into individual data signals. Then is step 410, the destination transceiver receiving a group of CDMA-encoded signals sends the signals to the destination devices serviced by the destination transceiver. The procedure then ends. Destination devices serviced by the destination transceiver extract CDMA-encoded signals intended for them and decode the signals accordingly.

One major advantage to using the methods shown in FIGS. 2–4 is that, by the transmitter grouping multiple common-destination signals together, substantial on-board processing can be avoided by receivers. Rather than decoding each individual signal to determine where to route the signal, the receiver simply decodes the group code and routes the group to the appropriate destination.

Figure 5:
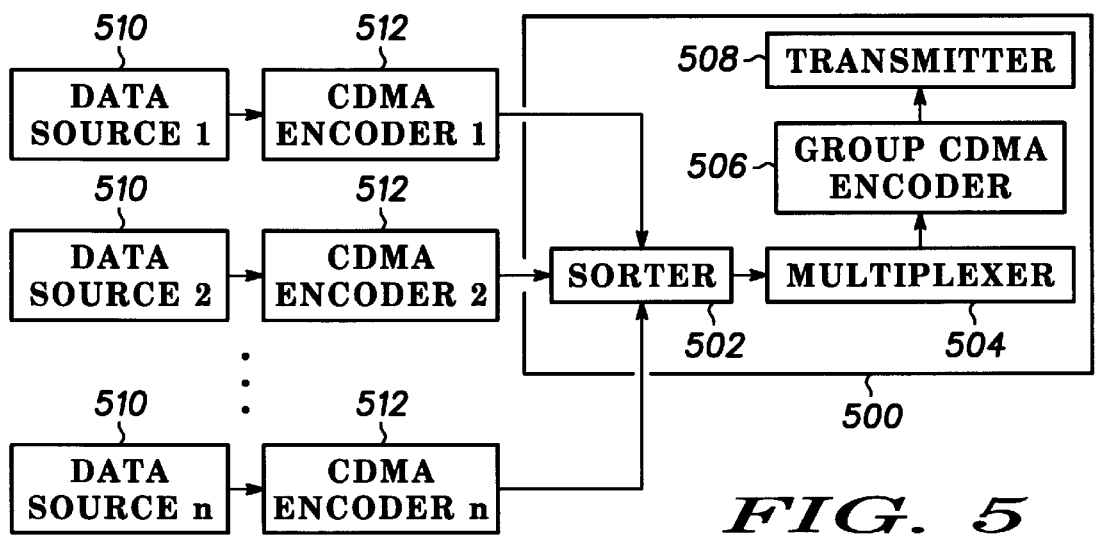
FIG. 5 illustrates a grouped-signal transmitter in accordance with a preferred embodiment of the present invention.

FIG. 5 illustrates a grouped-signal transmitter in accordance with a preferred embodiment of the present invention. Grouped-signal transmitter 500 includes a sorter 502, a multiplexer 504, a group CDMA encoder 506, and a transmitter 508.

As described in conjunction with FIG. 2, grouped-signal transmitter 500 receives a number of CDMA-encoded signals. The signals originated from multiple data sources 510 and are sent to grouped-signal transmitter 500 after each has been encoded by CDMA encoders 512.

Upon receipt by grouped-signal transmitter 500, sorter 502 sorts the signals based on their intended destinations and groups those with common destinations into distinct groups. Those groups are sent to multiplexer 504, which multiplexes the group of signals. The grouped signal is then group-encoded by group CDMA encoder 506 using a group code (or overlaying code) unique to the group. The encoded group is then transmitted to a remote receiver via transmitter 508.

In a preferred embodiment, grouped-signal transmitter 500 would have the capability of assembling as many groups as needed to send the signals to their intended destinations. Thus, each grouped-signal transmitter 500 could send multiple encoded groups.

FIG. 6 illustrates an intermediate transceiver in accordance with a preferred embodiment of the present invention. In a preferred embodiment, intermediate transceiver 600 is co-located with a receiver such as receiver 14, FIG. 1. Intermediate transceiver 600 includes multiple receiver front ends 602, multiple group CDMA decoders 604, multiple group combiners 606, multiple group encoders 608, and transmitter subsystem 610.

As described in conjunction with FIG. 3, intermediate transceiver 600 receives multiple encoded groups from multiple transmitters. These groups are received via receiver front ends 602. Each receiver front end 602 could receive a single or multiple groups.

Group CDMA decoders 604 then decode the groups using the appropriate group codes. In a preferred embodiment, group CDMA decoders 604 then sort the decoded groups based on the decoded groups' next destinations (e.g., a next intermediate transceiver or a destination transceiver). In an alternate embodiment, group sorting could be performed by devices other than decoders 604.

Each decoder 604 sends the sorted groups to group combiners 606, based on the next destination of each group. In a preferred embodiment, a group combiner 606 would collect each group which is destined for the same destination, and would combine the common-destination groups into super-groups.

These super-groups are then sent to group encoders 608 which CDMA encode the super groups using another group code. The encoded super-groups are then sent to their appropriate destinations via transmitter subsystem 610.

FIG. 7 illustrates a destination transceiver in accordance with a preferred embodiment of the present invention. In a preferred embodiment, destination transceiver 700 is co-located with a receiver such as receiver 14, FIG. 1. Destination transceiver 700 includes receiver front end 702, group CDMA decoder 704, and unit CDMA demultiplexers 706.

Receiver front end 702 receives grouped signals from multiple grouped-signal transmitters (e.g., transmitters 12, FIG. 1) or intermediate transceivers. Group CDMA decoder 704 then decodes each group, based on its unique group code. Each group is then routed to an appropriate unit CDMA demultiplexer 706 which is associated with the destination appropriate for that group code. Unit CDMA demultiplexers 706 then separate the signals, where appropriate, and send the CDMA-encoded signals to the appropriate destination. The signals are then finally decoded at the destination devices.

In summary, a method and apparatus has been described in which a transmitter groups together CDMA-encoded signals which are intended for a common destination, and further CDMA encodes the group with a "group" or "overlaying" code. The transmitter then sends the encoded group to a receiver, which decodes the group using an appropriate group code and, based on the group code, sends the group of CDMA-encoded signals to an appropriate destination. The method and apparatus of the present invention has numerous advantages over the prior art and solves problems not addressed in prior art systems.

The present invention has been described above with reference to preferred embodiments. However, those skilled in the art will recognize that changes and modifications may be made in these preferred embodiments without departing from the scope of the present invention. For example, the processes and stages identified herein may be categorized and organized differently than described herein while achieving equivalent results. These and other changes and modifications which are obvious to those skilled in the art are intended to be included within the scope of the present invention.

What is claimed is:

1. A method of routing a plurality of data signals from a plurality of data sources, comprising:

CDMA-encoding said plurality of data signals from said plurality of data sources to produce a plurality of encoded signals;

sorting said plurality of encoded signals based at least in part on a first intended destination;

multiplexing each of said plurality of encoded signals having said first intended destination into a first common destination group; and CDMA-encoding said first common destination group using a first group code which is unique for said first common destination group, resulting in a first multiple encoded group; and sending said first multiple encoded group to a receiver.

2. The method as claimed in claim 1, wherein CDMA-encoding said first common destination comprises:

CDMA-encoding said first common destination group using a first chip rate which is faster than a second chip rate used CDMA-encoding said plurality of data signals.

3. The method as claimed in claim 1, further comprising:

receiving said first multiple encoded group by said receiver;

determining where to route said first multiple encoded group based on said first group code; and f) routing said first multiple encoded group based on said determining where to route said first multiple encoded group based on said first group code.

4. The method as claimed in claim 3, further comprising:

decoding said first multiple encoded group into a decoded version of each of said plurality of encoded signals; and transmitting said decoded version of each of said plurality of encoded signals to an appropriate destination device.

5. The method as claimed in claim 1, further comprising:

receiving by said receiver said first multiple encoded group and a second multiple encoded group CDMA-encoded using a second;

decoding said first multiple encoded group using said first group code and said second multiple encoded group using said second group code;

sorting each of said plurality of encoded signals decoded using said first group code and each of a second plurality of encoded signals decoded using said second group code, said sorting based at least in part on a second intended destination;

coding each of said plurality of encoded signals and each of said second plurality of encoded signals having said second intended destination into a third common destination group using a third group code which is unique for said third common destination group resulting in a third multiple encoded group; and h) sending said third multiple encoded group to a second receiver.

6. A group-signal transmitter comprising:

a sorter configured to sort a plurality of CDMA-encoded data signals into distinct groups, said sorter configured to sort said plurality of CDMA-encoded data signal into distinct groups based at least in part on a common destination;

a multiplexer coupled to the sorter, said multiplexer configured to multiplex each of said plurality of CDMA-encoded data signals having said common destination into a distinct group; and a group CDMA-encoder coupled to the multiplexer, said group CDMA-encoder configured to encode said distinct group using a group code unique to said distinct group.

* * * * *

UNITED STATES PATENT AND TRADEMARK OFFICE
CERTIFICATE OF CORRECTION

PATENT NO. : 6,144,654
DATED : November 7, 2000
INVENTOR(S) : Rodrigo Ibanez-Meier et al.

It is certified that error appears in the above-identified patent and that said Letters Patent is hereby corrected as shown below:

Column 6,
Line 67, delete "second;" and replace with -- second group code; --.

Column 7,
Line 16, delete "h" at the beginning of the sentence.

Signed and Sealed this

Thirteenth Day of August, 2002

Attest:

Attesting Officer

JAMES E. ROGAN
Director of the United States Patent and Trademark Office